Patented May 22, 1951

2,553,845

UNITED STATES PATENT OFFICE 2,553,845

PREPARATION OF ALKOXYSILANES

Harold A. Clark, Midland, Mich., assignor to Dow Corning Corporation, Midland, Mich., a corporation of Michigan No Drawing. Application June 20, 1949, Serial No. 100,307

4 Claims. (Cl. 260—448.8)

This invention relates to a method of preparing monocyclic aryl alkoxysilanes.

Alkoxysilanes of the type $R_nSi(OR)_{4-n}$, where R is a monovalent hydrocarbon radical, are known in the art. Heretofore these materials have been prepared by liquid phase reactions of alcohols with chlorosilanes. In the case of monocyclic aryl alkoxysilanes, this method works satisfactorily on a laboratory scale but on a commercial scale the yield of aryl alkoxysilane is in the neighborhood of only 50 to 60 percent of theoretical. The low yield is due primarily to the fact that the hydrogen chloride formed reacts with the alcohol to produce an alkyl chloride and water. Thus, not only is a large part of the alcohol lost, but also water formed during the reaction hydrolyzes the chlorosilane and produces a large residue of polysiloxanes.

Improved yields have been obtained by carrying out the reaction in the presence of a hydrogen halide acceptor such as pyridine. Such a method is not desirable for commercial scale operations.

It is an object of this invention to provide a commercially feasible method of preparing aryl alkoxysilanes of high purity and in high yields.

In accordance with this invention, a saturated aliphatic alcohol containing less than four carbon atoms is reacted in vapor phase with a liquid chlorosilane of the type $R_nSiCl_{4-n}$ where $n$ has a value of 1 to 3 and R is selected from the group monocyclic aryl and methyl radicals. In all cases at least one R is a monocyclic aryl radical.

The chlorosilanes employed in this invention are well known in the art as is their method of preparation. Any chlorosilane which contains one or more monocyclic aryl radicals as, for example, phenyl, tolyl and chlorophenyl radicals, may be employed in this invention. The remaining organic groups, if any, are methyl radicals. These chlorosilanes are of the types $RSiCl_3$, $R_2SiCl_2$ and $R_3SiCl$. The reaction may be carried out using one of the above defined silanes or a mixture of any number of them.

Any saturated aliphatic alcohol which boils below the chlorosilane or the alkoxysilane reaction product may be employed in this invention. However, the preferred alcohols are methanol, ethanol, propanol and isopropanol. Obviously the alcohol should be free from water.

Reaction is carried out by contacting the liquid chlorosilane with the alcohol vapors. This may be accomplished in any convenient manner. For example, the alcohol vapors may be bubbled through the chlorosilane. Alternatively, the liquid chlorosilane may be run through a packed column while the alcohol vapors are put through the column in the opposite direction.

The temperature and pressure must be so correlated that the alcohol remains in vapor phase throughout the reaction while the silanes remain in liquid phase. Under these conditions, HCl is removed from the reaction mixture as it is formed and thus does not react with the alcohol. The precise temperature and pressure employed will vary depending upon the alcohol and silanes being reacted. In general, temperatures between 20° C. and 150° C. and pressures from 10 mm. of Hg and 150 mm. of Hg are sufficient.

By employing the method of this invention, it is possible to prepare on a commercial scale aryl alkoxysilanes in yields of 98 percent of theoretical. This represents a saving of 50 percent in the material costs over past methods of commercially producing aryl alkoxysilanes.

Aryl alkoxysilanes are valuable intermediates in the production of polysiloxanes which materials have a well known commercial value.

The following examples are illustrative of this invention.

Example 1

A six foot column packed with glass helices was provided at the top with a means for introducing chlorosilanes and at the bottom with a means for introducing alcohol vapors. 4800 g. of liquid chlorophenylmethyldichlorosilane was added at the top of the column and allowed to flow downward. 2200 g. of dry ethanol was added in vapor state at the bottom of the column and the reaction mixture was maintained at a temperature of 100° C. and a pressure of from 50 to 70 mm. The alcohol vapors passed up through the column and therein reacted with the liquid chlorosilane. Chlorophenylmethyldiethoxysilane thereby produced was collected in a flask at the bottom of the column while HCl was removed at the top of the column. The relative rates of addition of the chlorosilane and the alcohol was such that there was two mols plus a 10 percent excess of alcohol per mol of chlorosilane in the reaction chamber. The product consisted of 96 percent of the theoretical amount of chlorophenylmethyldiethoxysilane.

Example 2

4450 g. of phenylmethyldichlorosilane was reacted with 2375 g. of dry ethanol in the manner of Example 1. There was obtained a 98 percent yield of phenylmethyldiethoxysilane.

Example 3

When tolylmethyldichlorosilane is reacted with dry ethanol in the manner of Example 1, a 95 percent yield of tolylmethyldiethoxysilane is obtained.

Example 4

A two inch glass column six feet long was packed with glass helices and assembled in such a manner that silicon chlorides could be introduced at the top and methanol vapor could be introduced at the bottom. The apparatus was operated continuously at pressures below 100 mm. and at a temperature between 60° C. and 90° C. A chlorosilane mixture having the composition 5 mol percent phenyldimethylchlorosilane, 15 mol percent phenyltrichlorosilane and 80 mol percent phenylmethyldichlorosilane was added at the top of the column at a rate of 600 to 650 cc. per hour. Methanol vapor was added at the bottom of the column at such a rate that there was a 20 percent molar excess of methanol in the reaction mixture. The product was removed continuously from the bottom of the column and HCl was removed continuously at the top.

A 331 g. aliquot of the reaction product was removed and distilled. It boiled at 74° C. to 89° C. at 8 mm. There was obtained 313 g. of a mixture of phenyldimethylmethoxysilane, phenylmethyldimethoxysilane and phenyltrimethoxysilane. 9 g. of non-distillable residue remained.

Example 5

382 g. of phenylmethyldichlorosilane was placed in a tube and 146 g. of methanol was added in vapor phase through a capillary at the bottom of the chlorosilane. During the reaction the pressure was from 40 to 50 mm. and the temperature was 25° C. HCl was removed from the top of the tube. The product consisted of 97 percent phenylmethyldimethoxysilane and 3 percent of non-distillable residue.

Example 6

When diphenyldichlorosilane is reacted with methanol in the manner of Example 5, a 95 percent yield of diphenyldimethoxysilane is obtained.

That which is claimed is:

1. A process comprising reacting a saturated aliphatic alcohol containing less than four carbon atoms per molecule, said alcohol being in vapor phase, with a liquid chlorosilane of the formula $R_n SiCl_{4-n}$ where $n$ has a value from 1 to 3 and R is selected from the group consisting of phenyl, chlorophenyl, tolyl and methyl radicals, there being at least one of the above defined monocyclic aryl radicals per molecule of chlorosilane whereby an alkoxy silane is obtained.

2. The method in accordance with claim 1 wherein the chlorosilane is phenylmethyldichlorosilane.

3. The method in accordance with claim 1 wherein the chlorosilane is chlorophenylmethyldichlorosilane.

4. The method in accordance with claim 1 wherein the chlorosilane is tolylmethyldichlorosilane.

HAROLD A. CLARK.

REFERENCES CITED

The following references are of record in the file of this patent:

UNITED STATES PATENTS

| Number | Name | Date |
| --- | --- | --- |
| 2,483,963 | Barry et al. | Oct. 4, 1949 |
| 2,484,394 | Van Zwet | Oct. 11, 1949 |